United States Patent [19]

Tokushima et al.

[11] Patent Number: 4,895,762
[45] Date of Patent: Jan. 23, 1990

[54] MAGNETIC RECORDING MATERIAL

[75] Inventors: Tadao Tokushima; Makoto Shiraki; Yoshifumi Suzuki; Yukio Wakui, all of Hamamatsu, Japan

[73] Assignee: Yamaha Corporation, Japan

[21] Appl. No.: 132,929

[22] Filed: Dec. 15, 1987

[30] Foreign Application Priority Data

Jan. 27, 1986 [JP] Japan ................. 61-313399

[51] Int. Cl.$^4$ .............................. G11B 5/64
[52] U.S. Cl. ................... 428/336; 427/130; 427/131; 427/132; 428/433; 428/469; 428/694; 428/900
[58] Field of Search ............ 428/336, 432, 433, 469, 428/694, 900; 427/129, 130, 131, 132; 204/42; 360/131, 135

[56] References Cited

U.S. PATENT DOCUMENTS

| 4,109,287 | 8/1978 | Kawai et al. | 204/42 |
| 4,548,682 | 10/1985 | Yoshida et al. | 204/42 |
| 4,563,397 | 1/1986 | Ishiguro et al. | 428/469 |
| 4,650,708 | 3/1987 | Takahashi | 428/694 |
| 4,659,606 | 4/1987 | Wada et al. | 428/694 |

Primary Examiner—Paul J. Thibodeau
Attorney, Agent, or Firm—Lerner, David, Littenberg, Krumholz & Mentlik

[57] ABSTRACT

In construction of a magnetic recording material having overlaid anodic oxide layers and well suited for perpendicular magnetic recording, a substrate is made of a hard material and Al predominant layers of 0.1 to 2 μm thickness and formed on the substrate as a base for the overlaid anodic oxide layers for improvement in mechanical properties with acceptable magnetic recording characteristics.

8 Claims, 2 Drawing Sheets

MAGNETIC RECORDING MATERIAL

BACKGROUND OF THE INVENTION

The present invention relates to an improved magnetic recording material, and more particularly relates to improvement in mechanical property of a magnetic recording material having anodic oxide layers and well suited for perpendicular magnetic recording.

A magnetic recording material of such a type is disclosed in, for example, Japanese Patent Publication Sho.51-21562, in which anodic oxidation is applied to a substrate made of Al or Al base alloy and magnetic substance is packed in fine pores in an anodic oxide layer on the substrate. Further, other examples are found in, for example, U.S. Pat. Nos. 4,650,708 and 4,681,669 as well as 1MB Technical Disclosure Bulletin Vol. II, Nos. 3, AUG., 1968.

In the case of such a magnetic recording material, the thinner the anodic oxide layer packed with the magnetic substance, the better the magnetic recording density ($D_{50}$) and the overwrite characteristics (O/W). However, a too thin construction of the anodic oxide layer reduces the output voltage (Vout) from a magnetic head and the strength of a magnetic layer. The optimum thickness of the anodic oxide layer is said to be in a range from 0.5 to 1.5 $\mu$m.

With the conventional magnetic recording material of this type, however, reduction in thickness of the anodic oxide layer lowers the mechanical strength and surface hardness, thereby degrading durability of the magnetic recording material. This is believed to be caused by the fact that the apparent rigidity of the relatively hard anodic oxide layer is impaired under influence of the substrate made of relatively soft Al or Al -base alloy. At starting and ending of rotation of a magnetic recording material, a magnetic head comes in abrasive contact with its anodic oxide layer. In addition, slight warp and/or vibration of the magnetic recording material causes such abrasive contact also. In order to withstand such abrasive attack, a magnetic recording material is required to have sufficient mechanical strength and surface hardness.

Despite such an intense demand, it is very difficult to reduce the thickness of the anodic oxide layer for the above-described reason. Use of relatively soft Al or Al -base alloy for the substrate additionally necessitates thick construction of the anodic oxide layer in order to cover poor flatness of the substrate. For these reasons, it is conventionally difficult to reduce the thickness of the anodic oxide layer below a range from 1.5 to 2 $\mu$m.

SUMMARY OF THE INVENTION

It is the object of the present invention to reduce the thickness of the anodic oxide layer on a magnetic recording material below the conventionally admitted range without any ill side effect on the mechanical properties and output characteristics of the magnetic recording material.

In accordance with the basic aspect of the present invention, a substrate is made of a hard material and Al predominant layers of 0.1 to 2 $\mu$m thickness are formed on the substrate as a base for overlaid anodic oxide layers.

DESCRIPTION OF THE PREFERRED EMBODIMENTS

Figure 1:
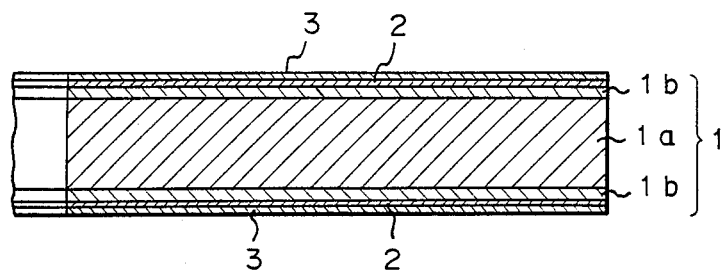
FIG. 1 is a side sectional view of one embodiment of the magnetic recording material in accordance with the present invention.

In FIG. 1, a hard substrate 1 includes an Al or Al alloy base 1a and two first anodic oxide layers 1b sandwiching the Al or Al alloy base 1a. The first anodic oxide layers 1b are formed by subjecting a crude Al alloy base to anodic oxidation in oxalic or sulfuric acid electrolyte. The thickness of the first anodic oxide layers 1b is in a range from 10 to 20 $\mu$m. The first anodic oxide layers 1b are applied to increase the hardness of the substrate 1. Any thickness below 10 $\mu$m would result no substantial hardening of the substrate. Anodic oxidation at this stage should preferably carried out at low temperature and high electric voltage.

An Al predominant layer 2 made of Al or Al -base alloy is formed on each first anodic oxide layer 1b by means of, for example, vacuum deposition, sputtering, ion plating or CVD process. Foil pressing is also employable. This Al predominant layer 2 acts as a base for the second anodic oxide layer and as an electrode for formation of the second anodic oxide layer. The thickness of the Al predominant layer 2 at formation is adjusted such that its ultimate thickness should be in a range from 0.1 to 2 $\mu$m. When the thickness at formation is too small, the electrode resistance is unduly increased at formation of the second anodic oxide layer. Whereas too large thickness at formation lowers the mechanical strength and the surface hardness of the second anodic oxide layer.

Figure 2:
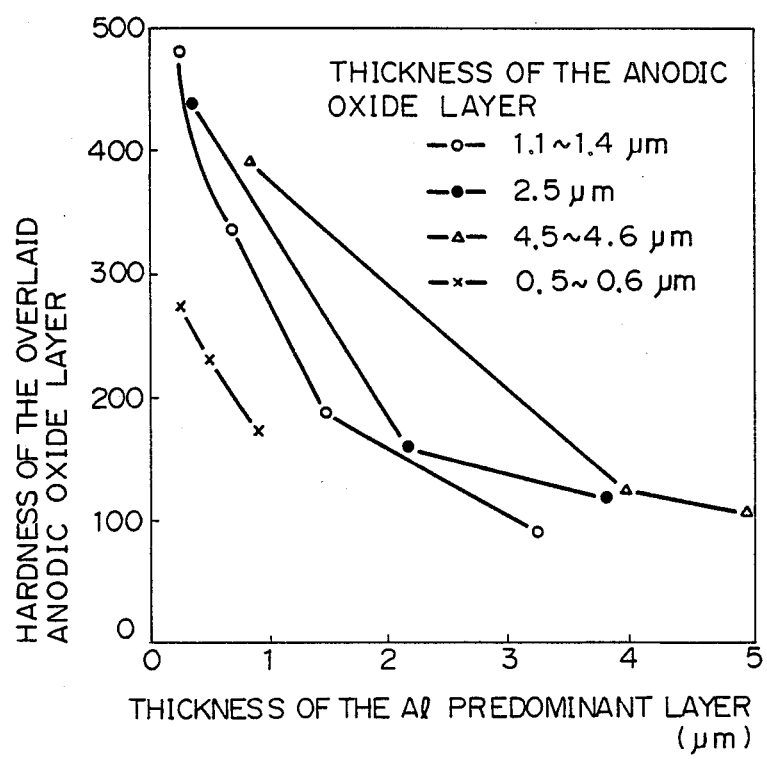
FIG. 2 is a graph for showing the relationship between the thickness of the underlaid Al predominant layer and the hardness of the overlaid anodic oxide layer.

In FIG. 2, the ultimate thickness in $\mu$m of the Al predominant layer 2 is taken on the abscissa and the hardness in Hv of the second anodic oxide layer is taken on the ordinate. It is clear from the graph that the ultimate thickness of the Al predominant layer 2 should be below 0.5 $\mu$m in order to keep the inherent hardness of the anodic oxide layer. Further, the thinner the second anodit oxide layer, the larger the influence of the ultimate thickness of the Al predominant layer.

The second anodic layers 3 are formed by anodic oxidation of the Al predominant layers 2 followed by electrolytic packing of fine pores with magnetic substance such as Fe, Ni and Co. The thickness of each second anodic oxide layer 3 should preferably be in a range from 0.5 to 1.5 $\mu$m. For anodic oxidation and precipitation of the magnetic substance, the substrate 1 is connected to an electrode for electric power supply through the Al predominant layers 2.

In accordance with the present invention, the surface of the substrate 1 is covered with the hard, first anodic oxide layers 1b and the Al predominant layer 2 has the thinnest possible thickness that enables sufficient electric power supply. As a consequence, the base for the second, overlaid anodic oxide layers 3 is thick enough to allow reduction in thickness of the overlaid anodic oxide layer 3 without marring the mechanical properties of the magnetic recording material. Significantly reduced thickness of the overlaid anodic oxide layer 3 provides the magnetic recording material with ideal magnetic recording characteristics.

Since the magnetic recording material as a whole is made of an Al predominant material and a magnetic disc device incorporating such a magnetic recording material is also made of Al predominant material, difference in thermal expansion between the two is rather insignificant in actual use. So, the disc device does not necessitate additional equipment of a servo mechanism which must be otherwise employed for compensation of tracking error to be caused by change in ambient temperature.

Figure 3:
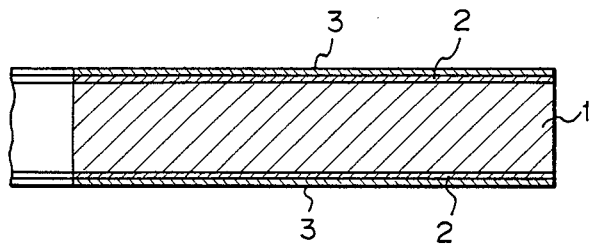
FIG. 3 is a side sectional view of another embodiment of the magnetic recording material in accordance with the present invention.
Figure 4:
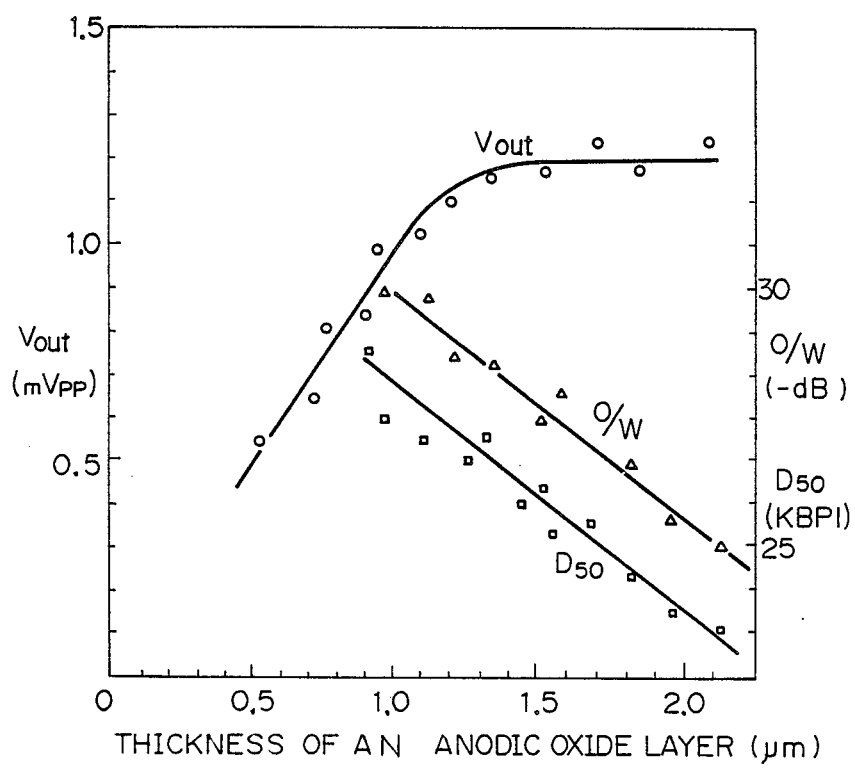
FIG. 4 is a graph for showing the general relationships between the thickness of an anodic oxide layer and the magnetic recording density and the overwrite characteristics, respectively.

Another embodiment of the magnetic recording material in accordance with the present invention is shown in FIG. 3, in which the substrate 1 has a unitary construction made of an inorganic, non-metallic material such as hard glass and ceramics.

Example

A disc shaped substrate made of Al -4%Mg alloy was used for test. The thickness was 1.9mm, the inner diameter was 24mm and the outer diameter was 95mm. After surface cleaning, the substrate was subjected to the first stage anodic oxidation in 3% oxalic acid electrolyte at 10° C. and 20V to form the first anodic oxide layers of 20 $\mu$m thickness. Then the thickness was reduced to 10 $\mu$m by surface polishing. Next, Al layers of 5.0 $\mu$m thickness were formed on the hard substrate by means of vacuum deposition. The second stage anodic oxidation was carried out in 3% oxalic acid electrolyte at 10° C. and 45V (DC) to form the second anodic oxide layers of 3.5 $\mu$m. Subsequent electrolysis was carried out in ammonium ferrous sulfate electrolyte for precipitation of Fe in pores in the second anodic oxide layers. By surface grinding, the thickness of the second anodic oxide layers was reduced to 1.0 $\mu$m. For surface protection, graphite layers of 25 $\mu$m were formed by sputtering on the second anodic oxide layers.

The magnetic recording material so prepared was subjected to a contact-start-stop test (CSS test) and the result of measurement was $30 \times 10^3$ times. When measured by a ferrite ring head of 0.6 $\mu$m gap, the magnetic recording density ($D_{50}$) was 28kBPI and the overwrite characteristics (O/W) was 30dB.

For comparison, a same disc shaped substrate was subjected to anodic oxidation in 3% oxalic electrolyte at 10° C. and 45V to form anodic oxide layers of 3 $\mu$m thickness. Precipitation of Fe was carried out in a same way. By surface grinding, the thickness of the anodic oxide layers was reduced to 1.0 $\mu$m. Same protective graphite layers were formed thereon.

In a same CSS test, head crash started below $10^3$ times. $D_{50}$ was 28kBPI and O/W was 30dB. Deposition of dirts on the pherite ring head caused the head crash. Such deposition of dirts was caused by presence of inclusions in the alldy.

We claim:

1. An improved magnetic recording material comprising an Al or Al alloy substrate, and including an anodic oxide layer formed on the surface of said substrate, a primary layer comprising an Al or Al alloy of 0.1 to 2 micron thickness formed on the surface of said anodic oxide layer, an anodic oxide surface layer provided with a plurality of pores and formed on the surface of said primary layer, and a ferromagnetic substance within said plurality of pores in said anodic oxide surface layer.

2. The improved magnetic recording material of claim 1 in which the thickness of said anodic oxide layer formed on the surface of said substrate is in a range from 10 to 20 $\mu$m.

3. The improved magnetic recording material of claim 1, in which said substrate has a hardness which is less than that of said anodic oxide layer formed on the surface of said substrate.

4. The improved magnetic recording material of claim 1, in which said substrate comprises first and second surfaces, and which said anodic oxide layer comprises a first anodic oxide layer on said first surface of said substrate, said primary layer comprises a first primary layer of Al or Al alloy on said first, anodic oxide layer, and said anodic oxide surface layer comprises a first anodic oxide surface layer formed on the surface of said first primary Al or Al alloy layer, said material also including a second anodic oxide layer on said second surface of said substrate, a second primary Al or Al alloy layer on said second anodic oxide layer, and a second anodic oxide surface layer provided with a plurality of pores and formed on the surface of said second primary Al or Al alloy layer and a ferromagnetic substance within said plurality of pores in said second anodic oxide surface layer.

5. An improved magnetic recording material comprising an inorganic non-metallic substrate having a unitary construction and first and second surfaces, first and second primary layers of 0.1 to 2 micron thickness formed on said first and second surfaces, respectively, of said substrate, comprising Al or Al alloy, first and second anodic oxide layers, each provided with a plurality of pores and formed on the surface of said first and second primary layers, respectively, and a ferromagnetic substance within said plurality of pores in each of said anodic oxide surface layers.

6. The improved magnetic recording material of claim 5, in which said in organic nonmetallic material is selected from the group consisting of glass and ceramics.

7. An improved magnetic recording material comprising an Al or Al alloy substrate, and including an anodic oxide layer formed on the surface of said substrate, a primary layer comprising an Al or Al alloy of 0.1 to 2 micron thickness formed on the surface of said anodic oxide layer, an anodic oxide surface layer of 0.5 to 1.5 micron thickness provided with a plurality of pores and formed on the surface of said primary layer and a ferromagnetic substance within said plurality of pores in said anodic oxide surface layer.

8. An improved magnetic recording material comprising an inorganic non-metallic substrate having a unitary construction and first and second surfces, first and second primary layers comprising an Al or Al alloy of 0.1 to 2 micron thckness formed on said first and second surfaces, respectively, of said substrate, first and second anodic oxide layers or 0.5 to 1.5 micron thickness, each provided with a plurality or pores and formed on the surface of said first and second primary layers, respectively, and a ferromagnetic substance within said plurality of pores in each of said anodic oxide surface layers.

* * * * *

UNITED STATES PATENT AND TRADEMARK OFFICE
CERTIFICATE OF CORRECTION

PATENT NO. : 4,895,762

DATED : Jan. 23, 1990

INVENTOR(S) : Tokushima et al.

It is certified that error appears in the above-identified patent and that said Letters Patent is hereby corrected as shown below:

On the cover page, under FOREIGN APPLICATION PRIORITY DATA, "Jan. 27, 1986" should read --Dec. 27, 1986--.
Column 2, line 54, "anodit" should read --anotic--.
Column 2, line 56, after "The second anodic" insert --oxide--.
Column 4, line 62, "or" should read --of--.

Signed and Sealed this

Thirtieth Day of July, 1991

Attest:

HARRY F. MANBECK, JR.

*Attesting Officer*     *Commissioner of Patents and Trademarks*